US011614891B2

(12) United States Patent
Brewer

(10) Patent No.: US 11,614,891 B2
(45) Date of Patent: Mar. 28, 2023

(54) COMMUNICATING A PROGRAMMABLE ATOMIC OPERATOR TO A MEMORY CONTROLLER

(71) Applicant: Micron Technology, Inc., Boise, ID (US)

(72) Inventor: Tony Brewer, Plano, TX (US)

(73) Assignee: Micron Technology, Inc., Boise, ID (US)

(*) Notice: Subject to any disclaimer, the term of this patent is extended or adjusted under 35 U.S.C. 154(b) by 73 days.

(21) Appl. No.: 17/074,937

(22) Filed: Oct. 20, 2020

(65) Prior Publication Data

US 2022/0121395 A1 Apr. 21, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
CPC .............................. G06F 3/0659; G06F 3/0604
See application file for complete search history.

(56) References Cited

U.S. PATENT DOCUMENTS

| 8,122,229 | B2 | 2/2012 | Wallach et al. |
| 8,156,307 | B2 | 4/2012 | Wallach et al. |
| 8,205,066 | B2 | 6/2012 | Brewer et al. |
| 8,423,745 | B1 | 4/2013 | Brewer |
| 8,561,037 | B2 | 10/2013 | Brewer et al. |
| 9,710,384 | B2 | 7/2017 | Wallach et al. |
| 10,990,391 | B2 | 4/2021 | Brewer |
| 10,990,392 | B2 | 4/2021 | Brewer |
| 2008/0270708 | A1 | 10/2008 | Warner et al. |
| 2012/0079177 | A1 | 3/2012 | Brewer et al. |
| 2013/0332711 | A1 | 12/2013 | Leidel et al. |
| 2015/0143350 | A1 | 5/2015 | Brewer |
| 2015/0206561 | A1 | 7/2015 | Brewer et al. |
| 2017/0235511 | A1* | 8/2017 | Palmer ................... G06F 3/0629 711/154 |
| 2019/0042214 | A1 | 2/2019 | Brewer |
| 2019/0171604 | A1 | 6/2019 | Brewer |
| 2019/0243700 | A1* | 8/2019 | Brewer ................ G11C 7/1045 |
| 2019/0272119 | A1* | 9/2019 | Brewer ............... G06F 12/0815 |
| 2019/0303154 | A1 | 10/2019 | Brewer |
| 2019/0324928 | A1 | 10/2019 | Brewer |
| 2019/0340019 | A1 | 11/2019 | Brewer |

(Continued)

FOREIGN PATENT DOCUMENTS

| CN | 114385236 | 4/2022 |
| WO | 2010051167 | 5/2010 |

(Continued)

*Primary Examiner* — Daniel D Tsui
*Assistant Examiner* — Nicholas A. Paperno
(74) *Attorney, Agent, or Firm* — Schwegman Lundberg & Woessner, P.A.

(57) ABSTRACT

Devices and techniques for communicating a programmable atomic operator to a memory controller are described herein. A memory controller can receive a memory request and extract a command indicator that indicates a programmable atomic operator (PAO) command from the memory request. The memory controller can then extract a PAO index from the request and invoke the PAO based on the PAO index.

44 Claims, 8 Drawing Sheets

(56) References Cited

U.S. PATENT DOCUMENTS

| | | | |
|---|---|---|---|
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0356485 A1* | 11/2020 | Winkelmann | G06F 13/1668 |
| 2021/0055964 A1 | 2/2021 | Brewer | |
| 2021/0064374 A1 | 3/2021 | Brewer | |
| 2021/0064435 A1 | 3/2021 | Brewer | |
| 2021/0149600 A1 | 5/2021 | Brewer | |

FOREIGN PATENT DOCUMENTS

| | | |
|---|---|---|
| WO | 2013184380 | 12/2013 |
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

* cited by examiner

COMMUNICATING A PROGRAMMABLE ATOMIC OPERATOR TO A MEMORY CONTROLLER

STATEMENT REGARDING GOVERNMENT SUPPORT

This invention was made with U.S. Government support under Agreement No. HR00111890003, awarded by DARPA. The U.S. Government has certain rights in the invention.

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets can be packaged together to facilitate interconnection with other components of a larger system. Each chiplet can include one or more individual integrated circuits (ICs), or "chips", potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics can be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. The illustrated chiplet system includes a memory controller. The chiplet system includes a packet-based network to communicate between chiplets. The memory controller includes a programmable atomic unit (PAU) with a processor to execute a custom program, a programmable atomic operator (PAO), in response to a memory request for the programmable atomic operator. Additional details about the PAU are described below with respect to FIGS. 2 and 4.

Supporting POAs involves the ability to transmit an operation to be performed as well as possible arguments to the PAU from a requesting process or chiplet. Once the operation is complete, the completion should be signaled to the requesting process with any potential return values. In conventional processor systems, access to memory is generally supported by using read and write operations on a dedicated memory connection (e.g., bus, interconnect, etc.). The interconnect is often very strict with respect to timing and content, often hampering efforts to implement functionality such as that embodied in the PAU.

To address traditional architectural limitations, the present disclosure describes a packet-based request and response technique to specify the PAO as well as return a response to the request. Specifically, PAOs can be initiated from a requesting process (e.g., on an application chiplet) and routed to the memory controller in a packet. The memory controller decodes the packet, identifies the PAO from several supported by the PAU, and invokes the PAO. When the PAO is completed, a packet is created that contains the response (e.g., return code, result data, etc.). The response is then transmitted by the chiplet network to the requesting process.

The request and response packets are generally formed like other memory request and response packets in the chiplet system. However, the request packet includes additional fields (e.g., an extended header) to identify which of several PAOs to invoke based on the request. By using the packet-based PAO invocation approach described herein, a flexible and efficient invocation of PAOs can be achieved. Additional details and examples are provided below.

Figure 1A:
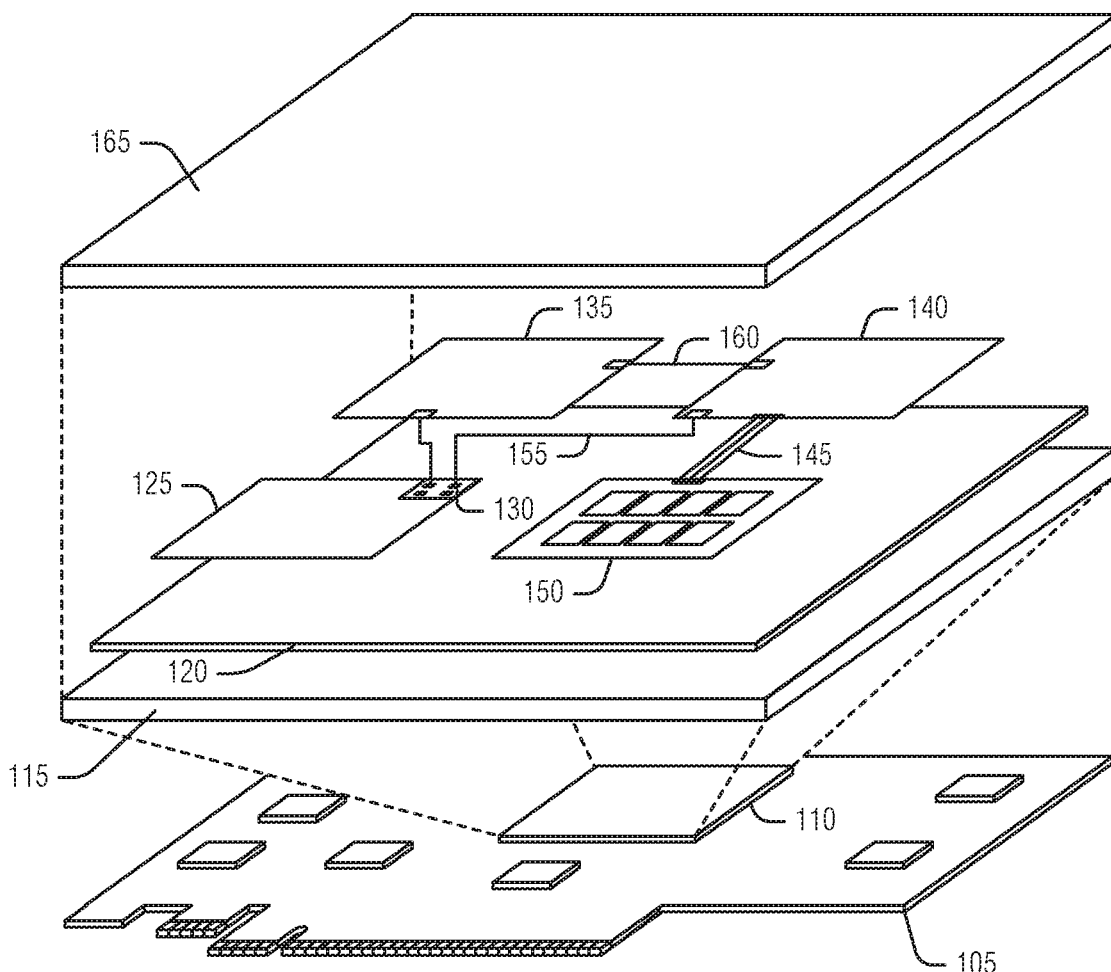
FIGS. 1A and 1B illustrate an example of a chiplet system, according to an embodiment.
Figure 1B:
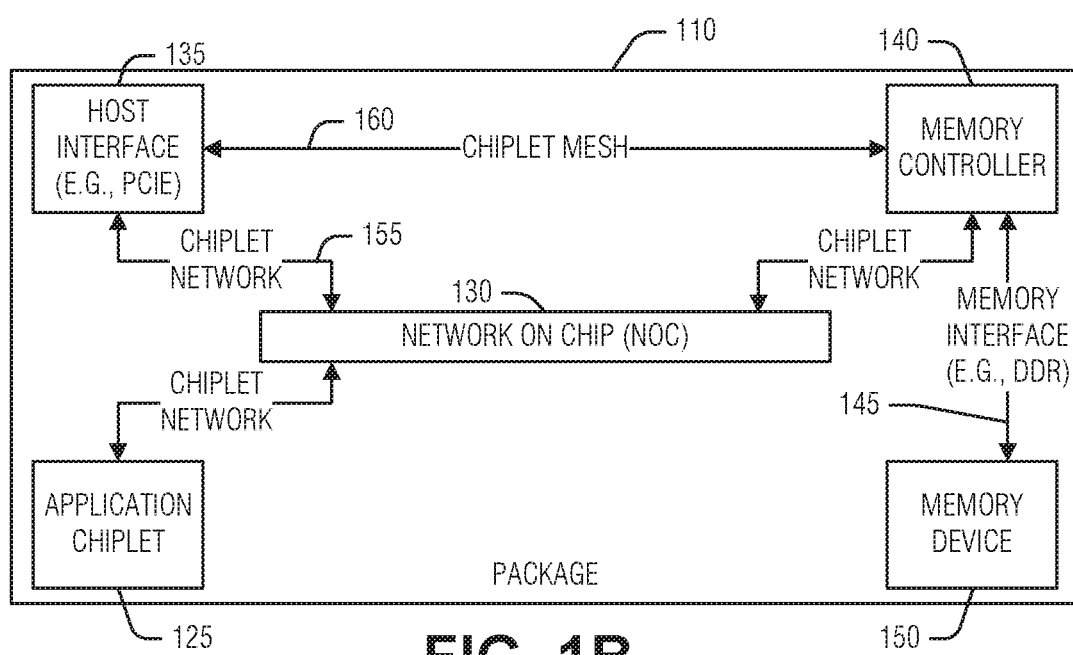

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems can include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 can be included on the application chiplet 125. In an example, NOC 130 can be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock.

Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface can be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operator execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 140. In other chiplet systems, the atomic operators can be performed by other chiplets. For example, an atomic operator of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operators avoid transmitting the data across the chiplet network 160, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets can be provided. In an example, these memory device chiplets can each implement one or multiple storage technologies. In an example, a memory chiplet can include, multiple stacked memory die of different technologies, for example one or more static random access memory (SRAM) devices stacked or otherwise in communication with one or more dynamic random access memory (DRAM) devices. Memory controller 140 can also serve to coordinate operations between multiple memory chiplets in chiplet system 110; for example, to utilize one or more memory chiplets in one or more levels of cache storage, and to use one or more additional memory chiplets as main memory. Chiplet system 110 can also include multiple memory controllers 140, as can be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
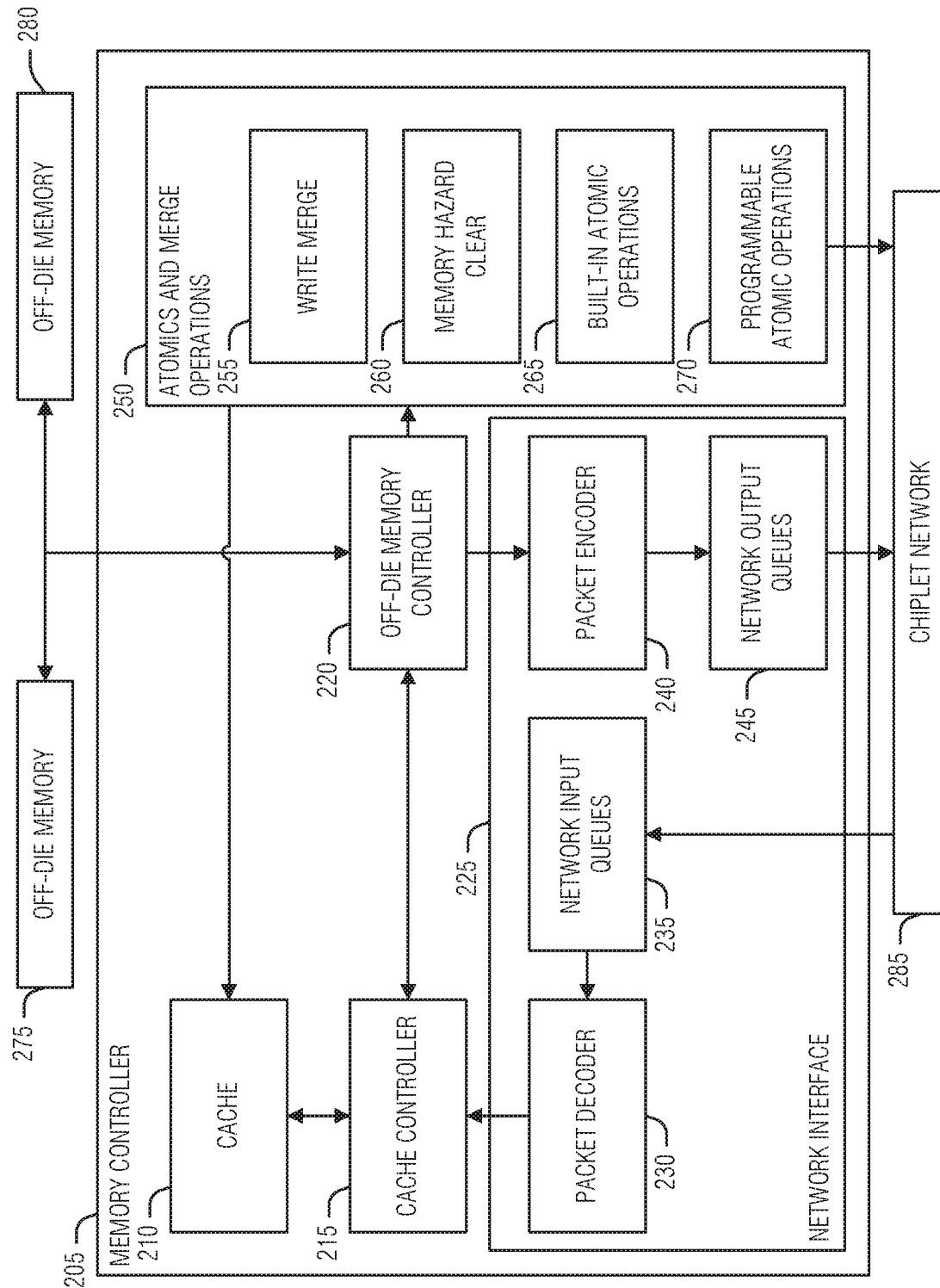
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples can be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and can be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache can also be implemented in off-die memories 275 or 280; and in some such examples can be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operator, the built-in atomic unit 265 receives the request and reads data, either from the write merge unit 255 or directly from the off-die memory controller 220. The atomic operator is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operators such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and optionally up to 32-bytes of data. The atomic operator performs the read-modify-write to a cache memory line of the cache 210, filling the cache memory if necessary. The atomic operator response can be a simple completion response, or a response with up to 32-bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operators can also involve requests for a "standard" atomic operator on the requested data, such as comparatively simple, single cycle, integer atomics-such as fetch-and-increment or compare-and-swap-which will occur with the same throughput as a regular memory read or write operation not involving an atomic operator. For these operations, the cache controller 215 can generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic operator. Following the atomic operator, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operators (also referred to as "custom atomic transactions" or "custom atomic operators"), comparable to the performance of built-in atomic operators. Rather than executing multiple memory accesses, in response to an atomic operator request designating a programmable atomic operator and a memory address, circuitry in the memory controller chiplet 205 transfers the atomic operator request to PAU 270 and sets a hazard bit stored in a memory hazard register corresponding to the memory address of the memory line used in the atomic operator, to ensure that no other operation (read, write, or atomic) is performed on that memory line, which hazard bit is then cleared upon completion of the atomic operator. Additional, direct data paths provided for the PAU 270 executing the programmable atomic operators allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operators. When provided with the extended instruction set for executing programmable atomic operators, the PAU 270 can be embodied as one or more hybrid threading processors. In some example embodiments, the PAU 270 provides barrel-style, round-robin instantaneous thread switching to maintain a high instruction-per-clock rate.

Programmable atomic operators can be performed by the PAU 270 involving requests for a programmable atomic operator on the requested data. A user can prepare programming code to provide such programmable atomic operators. For example, the programmable atomic operators can be comparatively simple, multi-cycle operations such as floating-point addition, or comparatively complex, multi-instruction operations such as a Bloom filter insert. The programmable atomic operators can be the same as or different than the predetermined atomic operators, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operator. Following the atomic operator, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operators is to provide multiple, generic, custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operator; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

To implement flexible and efficient programmable atomic operator requests, the network interface 205 is configured to obtain (e.g., receive) a memory request. In an example, the memory request is in the form of a CPI packet, such as the CPI memory request packet 500 described below with respect to FIG. 5. In the context of FIGS. 1 and 2, the memory request packet, originating, for example, at the application chiplet 125 (or from a process operating on the application chiplet 125) or the host interface chiplet 135 creates the CPI memory request packet and transmits it to the memory controller 205 (e.g., memory controller 140) through the NOC 285 (e.g., NOC 130).

The packet decoder 230, the cache controller 215, the off-die memory controller, the PAU 270, or other circuitry of the memory controller 205 is configured to extract a command indicator from the memory request. Here, the command indicator identifies a programmable atomic operator command. In an example, when the memory request is a CPI packet, the command indicator is in a first thirty-six bits of a header for the CPI packet. This programmable atomic operator command indicates that a programmable atomic operator is requested but does not identify the specific programmable atomic operator of possibly several supported by the PAU 270. Rather, the programmable atomic operator command prompts further inspection of the packet information to ascertain the specific PAO as well as any possible arguments provided for the programmable atomic operator in the request. With respect to the CPI memory request of FIG. 5, the programmable atomic operator command can correspond to the CMD field 505.

In response to the command indicator identifying the programmable atomic operator command, a programmable atomic operator index is extracted from the request. Here, the extraction of the programmable atomic operator index can be performed by the packet decoder 230, the cache controller 215, the off-die memory 220, the PAU 270, or other circuitry of the memory controller 205. In an example, when the memory request is in the form of a CPI packet, the programmable atomic operator index is in a field in an extension portion of a CPI extended header. For example, the shaded line 4 of the packet 500 is the extended header 510 in the packet 500. Here, the programmable atomic operator index can be the CaPIdx field of the extended header 510. In an example, the extended header includes a second extension portion that includes an argument to the PAO. In reference to the request packet 500, the extension portion includes any of the DATA fields in lines 5 and beyond. In an example, the second extension portion includes between one and four sixty-four bit arguments. Here, in the context of the request packet 500, the DATA field lines each hold a thirty-two bit DATA field, resulting in the illustrated data packet including two arguments, each argument comprising two DATA fields.

The PAU 270 is configured to invoke the programmable atomic operator based on the programmable atomic operator index. For example, given the PAU 400, the processor 405 can used the programmable atomic operator index to local a partition in the atomic instructions 425 and retrieve a kernel for the programmable atomic operator. This kernel can then be executed by the processor 405 to perform the programmable atomic operator. Thus, in an example, invoking the programmable atomic operator based on the programmable atomic operator index includes retrieving a kernel from a programmable atomic operator memory (e.g., the atomic instructions 425 in the local memory 410) of the PAU 270 based on the programmable atomic operator index. Then, the kernel can be executed on by the PAU 270. In an example, retrieving the kernel based on the programmable atomic operator index includes reading a partition from the programmable atomic operator memory starting at the PAO index. Here, the index refers to a starting point in the PAU instruction memory (e.g., the atomic instruction 425. The starting point can be multiplied by memory offsets to convert a partition number, for example 2, into a memory address. To retrieve the kernel, the local memory is read from the starting point until an ending point. The ending point can be specified as a number of words, or extents, in the memory, a final memory address, or a fixed memory address. In an example, the partition includes a terminating symbol, such that the memory is read from the starting point until the terminating symbol is encountered.

Once the PAU 270 executes the programmable atomic operator, a result is produced. In an example, the result is simply the return value of the programmable atomic operator, for example, indicating success or failure of the programmable atomic operator. In an example, the result is more complex, including data produced from the programmable atomic operator.

The PAU 270 can be configured to package the result by generating a memory response and communicating the memory response to a requestor that provided the memory request. Other components of the memory controller 205 can also participate in obtaining the result from the PAU 270 and generating the memory response, such as the off-die memory controller 220 or the packet encoder 204. In an example, the memory response is CPI packet (e.g., CPI response packet 600). In an example, the memory request was obtained from a CPI virtual channel one and the memory response is communicated using CPI virtual channel two.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
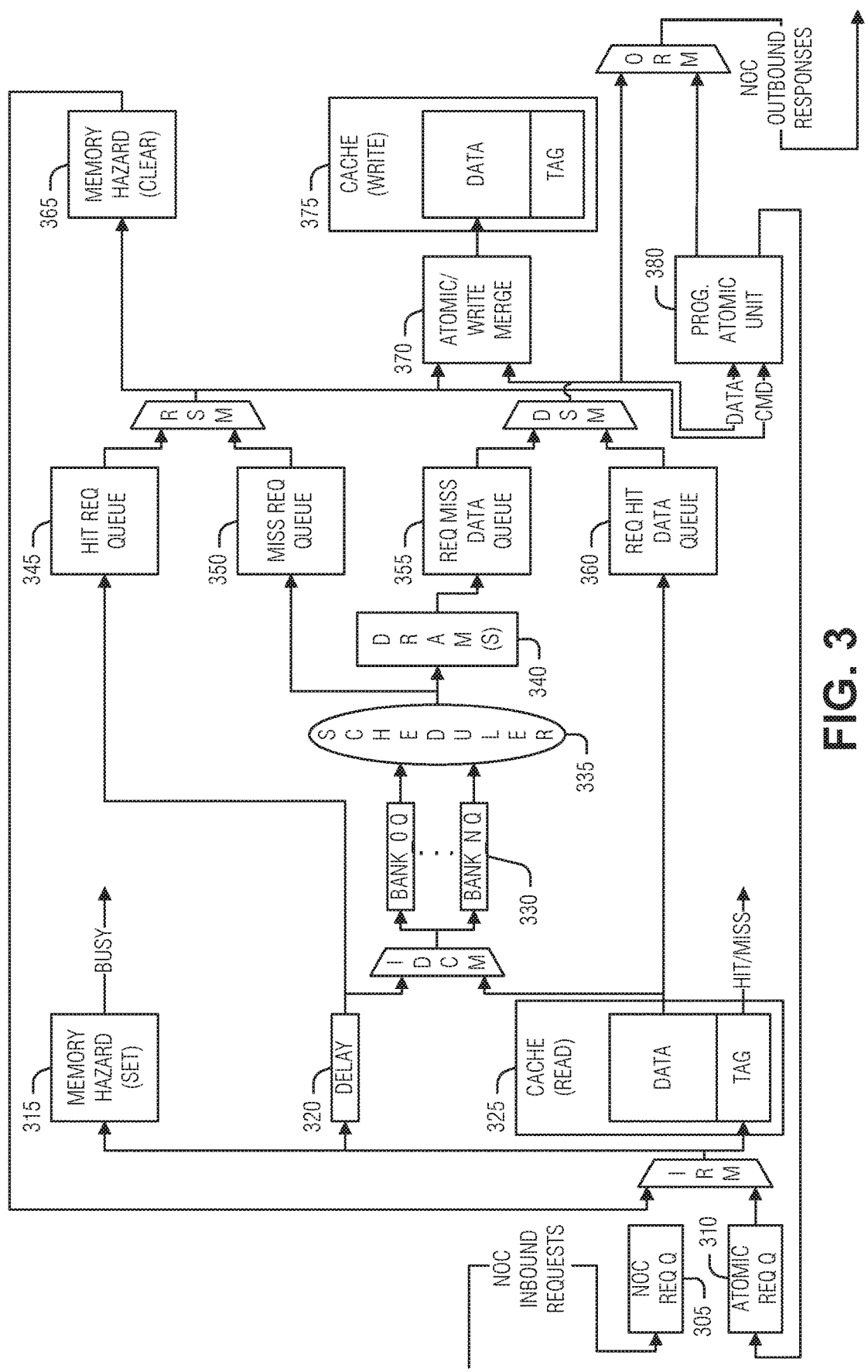
FIG. 3 illustrates components of an example of a memory controller chiplet, according to an embodiment.

FIG. 3 illustrates components of an example of a memory controller chiplet, according to an embodiment. FIG. 3 is another representation of a memory controller from the memory controller 205 illustrated in FIG. 2. Many of the same components shown in FIG. 2 are illustrated here. For example, the cache 302 and 385 are examples of cache 210; DRAM(s) 340 are examples of off-die memory 275-280; atomic/write merge 370 and the programmable atomic unit 380 may be an example of atomics and merge unit 250. Other components of FIG. 3 may be examples of other components of FIG. 2 such as off-die memory controller 220 and cache controller 215.

Other components, not specifically represented in the memory controller 205, can include the following. A NOC Request Queue 305 to receive requests from the network-on-chip and provide a small amount of queuing. An Atomic Request Queue 310 that receives requests from the programmable atomic unit 380 and provides a small amount of queuing. An Inbound Request Multiplexer (IRM) that selects between inbound memory request sources. In an example, the three memory request sources, in order of priority are: Memory Hazard Requests, Atomic Requests, and Inbound NOC Requests.

The Cache (Read) 325 and Cache (Write) 375 are a single device implemented as, in an example, an SRAM data cache. The diagram illustrates the cache as two separate blocks (325 and 375), one providing read access, the other providing write access. A Delay Block 320 provides one or more pipeline stages to mimic the delay for an SRAM cache read operation. Generally, a cache miss accesses to the off-die memory 340 (e.g., off-die memory 280) to bring the desired data into the cache. While waiting for the memory response (e.g., access time for the DRAM 340), the memory line is not available for other requests. A Memory Hazard block (Set block 315 and Clear block 360) can maintain a table of hazard bits indicating which memory lines are unavailable for access. Thus, an inbound request that tries to access a line with a hazard is held by the Memory Hazard block until the hazard is cleared. Once the hazard is cleared then the request is resent through the Inbound Request Multiplexer. In an example, the memory line tag address is hashed to a hazard bit index. The number of hazard bits may be chosen to set the hazard collision probability to a sufficiently low level.

An Inbound DRAM Control Multiplexer (IDCM) selects from an inbound NOC request and a cache eviction request. For the Bank Request Queues 330, each separately managed DRAM bank has a dedicated bank request queue to hold requests until they can be scheduled on the associated DRAM bank.

The scheduler 335 selects across the bank request queues 335 to choose a request for an available DRAM bank. A Request Hit Data Queue 360 holds request data from cache hits until selected. A Request Miss Data Queue 355 holds data read from the DRAM(s) until selected. A Miss Request Queue 350 is used to hold request packet information for cache misses until the request is selected. A Hit Request Queue 345 holds request packet information for cache hits until selected. A Data Selection Multiplexer (DSM) selects between DRAM read data and cache hit read data. The selected data is written to the SRAM cache. Request Selection Multiplexer (RSM) selects between hit and miss request queues 345 and 355.

The Atomic/Write Merge 370 either merges the request data and DRAM read data, or, if the request is a built-in atomic (e.g., built-in atomic operation block 265), the memory data and request data are used as inputs for an atomic operation. The Cache (Write) block 375 represents the write port for the SRAM cache. Data from a NOC write request and data from DRAM read operations are written to the SRAM cache. The Memory Hazard (Clear) block 365 represents the hazard clear operation for the memory hazard structure. Clearing a hazard may release a pending NOC request and send it to the Inbound Request Multiplexer. The programmable Atomic Unit 380 processes programmable atomic operations (e.g., transactions). The NOC Outbound Response Multiplexer (ORM) selects between memory controller responses and custom atomic unit responses and sends the selection to the NOC.

Figure 4:
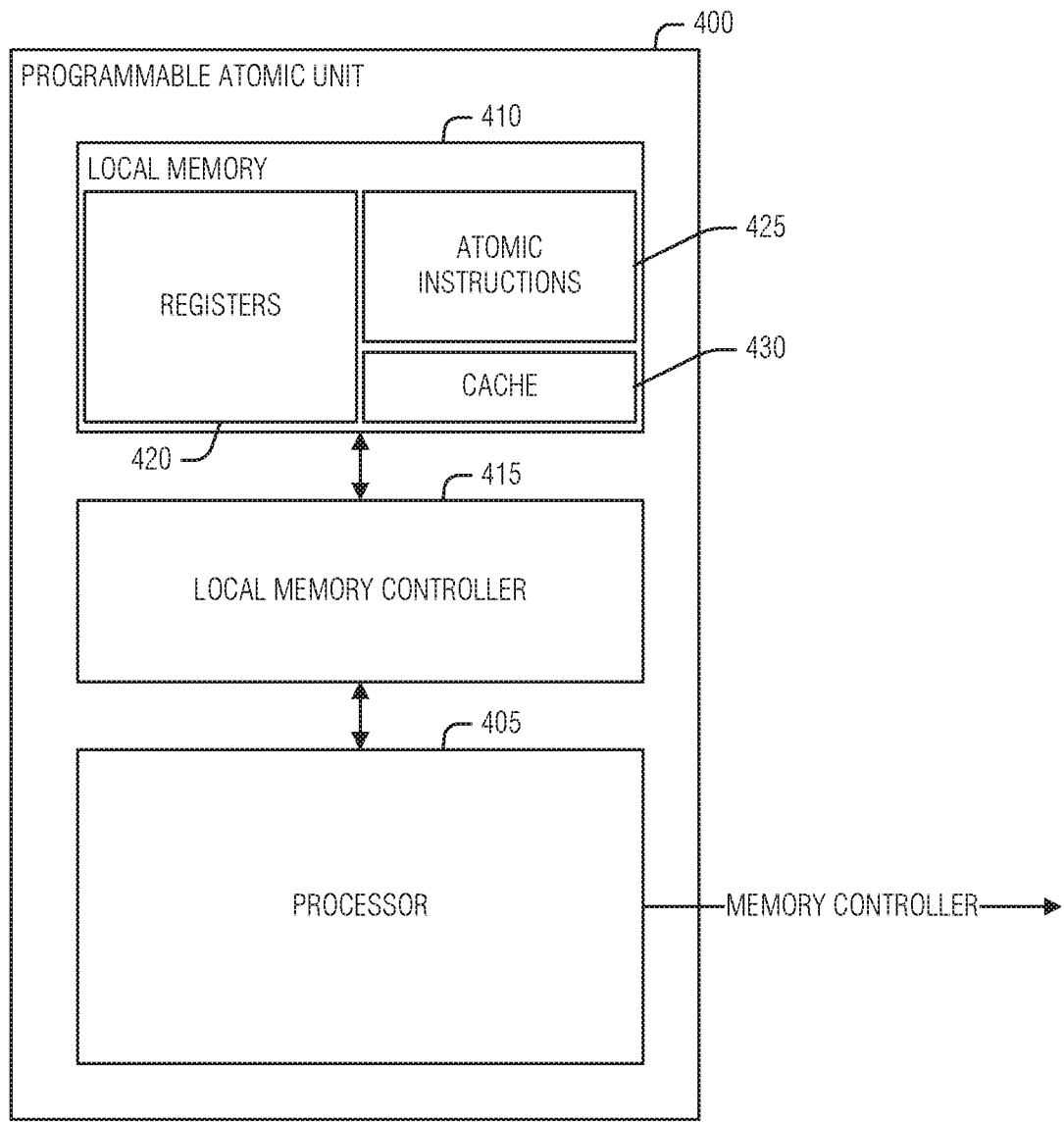
FIG. 4 illustrates components in an example of a programmable atomic unit (PAU), according to an embodiment.

FIG. 4 illustrates components in an example of a programmable atomic unit 400 (PAU), such as those noted above with respect to FIG. 1 (e.g., in the memory controller 140) and FIG. 2 (e.g., PAU 270), according to an embodiment. As illustrated, the PAU 400 includes a processor 405, local memory 410 (e.g., SRAM), and a controller 415 for the local memory 410.

In an example, the processor 405 is a pipelined such that multiple stages of different instructions are executed together per clock cycle. The processor 405 is also a barrel-multithreaded processor, with circuitry to switch between different register files (e.g., sets of registers containing current processing state) upon each clock cycle of the processor 405. This enables efficient context switching between currently executing threads. In an example, the processor 405 supports eight threads, resulting in eight register files. In an example, some or all of the register files are not integrated into the processor 405, but rather reside in the local memory 410 (registers 420). This reduces circuit complexity in the processor 405 by eliminating the traditional flip-flops used for these registers 420.

The local memory 410 can also house a cache 430 and instructions 425 for atomic operators. The atomic instructions 425 comprise sets of instructions to support the various application-loaded atomic operators. When an atomic operator is requested—by the application chiplet 125, for example—a set of instructions (e.g., a kernel) corresponding to the atomic operator are executed by the processor 405. In an example, the atomic instructions 425 are partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the PAU 400. Additional metadata for the programmable atomic instructions 425 can also be stored in the local memory 410, such as the partition tables.

Atomic operators manipulate the cache 430, which is generally synchronized (e.g., flushed) when a thread for an atomic operator completes. Thus, aside from initial loading from the external memory, such as the off-die memory 275 or 280, latency is reduced for most memory operations during execution of a programmable atomic operator thread.

Figure 5:
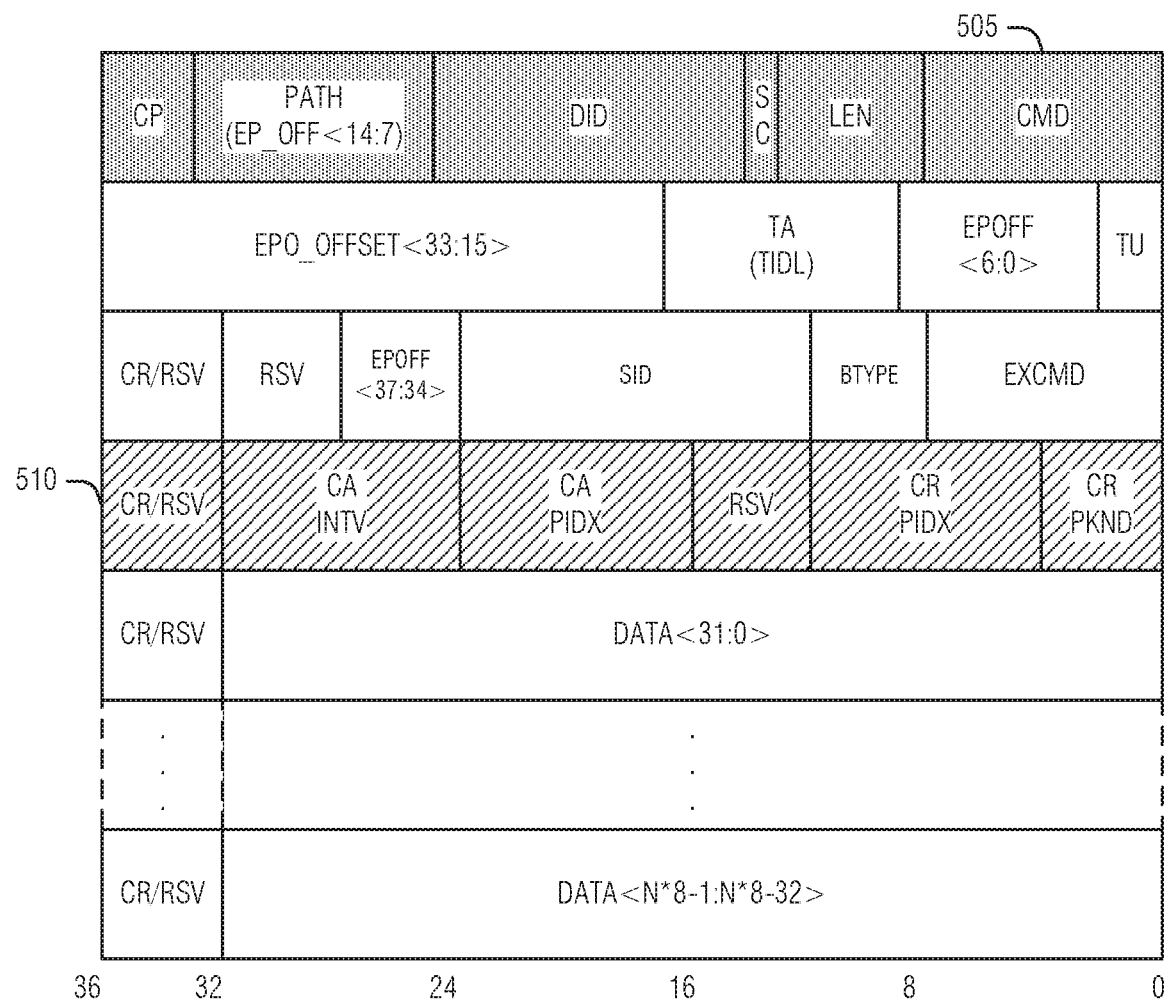
FIG. 5 illustrates a chiplet protocol interface request packet, according to an embodiment.

FIG. 5 illustrates a chiplet protocol interface request packet 500, according to an embodiment. The following is a table for an example of CPI field descriptions and bit lengths corresponding to the CPI request packet 500.

| Field Name | Field Width | Value | Field Description |
|---|---|---|---|
| Line 1 | | | |
| CMD | 8 | 126 | Extended virtual channel 1 (VC1) |
| LEN | 5 | | Packet Length |
| SC | 1 | 0 | Sequence Continue (ignored for external memory device (EMD)) |
| DID | 12 | | Destination NOC endpoint |
| PATH | 8 | | Endpoint Offset <14:7> |
| CP | 2 | 1 | Credit/Path Order (Credit Return enabled in flits 3-N and PATH field based path ordering) |
| Line 2 | | | |
| TU | 2 | | Transaction ID <9:8> |
| EPOff <6:0> | 7 | | Endpoint Offset <6:0> |
| TA | 8 | | Transaction IS <7:0> |
| EpOffset <33:15> | 19 | | Endpoint Offset <33:15> |
| Line 3 | | | |
| EXCMD | 8 | | Extended Command |
| BTYPE | 4 | 8 | BTYPE of 8 is EMD vendor defined |
| SID | 12 | | Source NOC Endpoint |
| EpOffset <37:34> | 4 | | Endpoint Offset <37:34> |
| RSV | 4 | 0 | Reserved |
| CR/RSV | 4 | | Credit Return |
| Line 4 | | | |
| CrPKnd | 4 | | Credit Pool Kind |
| CrPIdx | 8 | | Credit Pool Index |
| RSV | 4 | 0 | Reserved |
| CaPIdx | 8 | | Custom (Programmable) Atomic Partition Index |
| CaIntv | 8 | | Interleave Size |
| CR/RSV | 4 | | Credit Return |
| Lines 5 and Beyond | | | |
| DATA | 32 | | Argument data: 0,1, 2, or 4, 64-bit values |
| CR/RSV | 4 | | Credit Return |

As illustrated, line 4, the shaded line is an extended header 510. The command field 505 indicates that the request 500 is for a PAO. However, the entity decoding the request 500 and providing the PAO parameter to a PAU (e.g., PAU 270) will either pass the extended header 510 information to the PAU or decode the extended header 510 and provide the constituent fields as inputs to the PAU.

Figure 6:
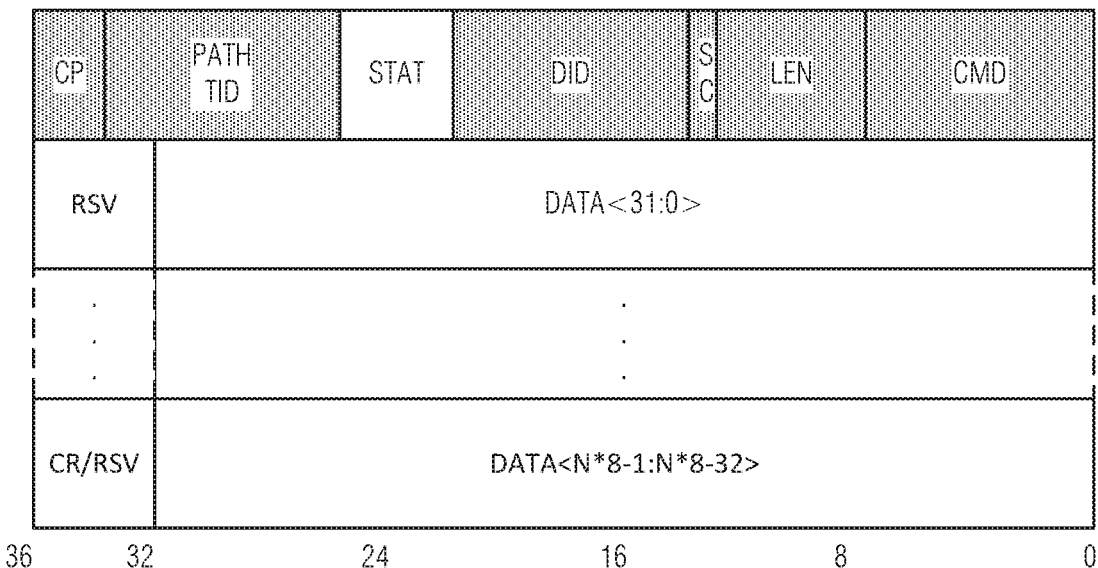
FIG. 6 illustrates a chiplet protocol interface response packet, according to an embodiment.

FIG. 6 illustrates a chiplet protocol interface response packet 600, according to an embodiment. The following is a table for an example of CPI field descriptions and bit lengths corresponding to the CPI response packet 600.

| Field Name | Field Width | Field Description |
|---|---|---|
| | | Line 1 |
| CMD | 8 | Packet command |
| LEN | 5 | Encoded packet Length |
| SC | 1 | Sequence Continue. When set, this packet is part of a multi-packet transfer and this packet is not the last packet in the sequence. In an example, this bit is present in the first flit of all packet types. |
| DID | 8 | Destination NOC Endpoint ID bits <7:0> |
| STAT | 4 | Response Status |
| PATH | 8 | The PATH field used to specify a path through a CPI fabric to force ordering between packets. For both CPI native and AXI over CPI, the read response packet's PATH field can contain a transaction identifier (TID) value. |
| TID | | |
| CP | 2 | Credit Present/Path Ordering. The CP field contains an encoded value that specifies both whether the field CR of flits 3-N of the packet contains credit return information and whether path ordering is enabled. |
| | | Lines 2 and beyond |
| DATA | 32 | Read Response Data, bits N*8-1:0 |
| CR/RSV | 4 | Credit Return Information |
| RSV | 4 | Reserved |

Figure 7:
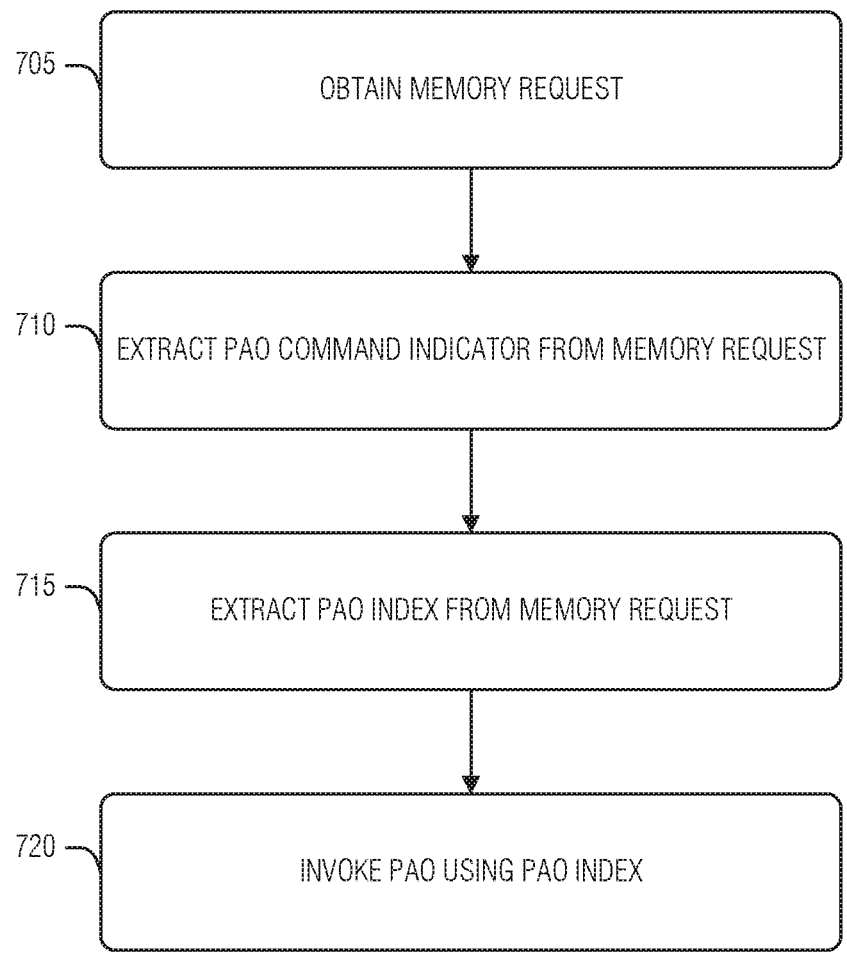
FIG. 7 is a flow chart of an example of a method for communicating a programmable atomic operator to a memory controller, according to an embodiment.

FIG. 7 is a flow chart of an example of a method 700 for communicating a programmable atomic operator (PAO) to a memory controller according to an embodiment. Operations of the method 700 are performed by computer hardware, such as that described with respect to FIG. 1 (e.g., memory controller chiplet 140), FIG. 2 (e.g., memory controller 205, FIG. 3, or FIG. 8 (e.g., processing circuitry).

At operation 705, a memory controller obtains (e.g., receives or retrieves) a memory request. In an example, the memory request is in the form of a CPI packet (e.g., CPI request 500).

At operation 710, a command indicator is extracted from the memory request. Here, the command indicator identifies a PAO command. In an example, when the memory request is a CPI packet, the command indicator is in a first thirty-six bits of a header for the CPI packet. In an example, the header is an extended header.

At operation 715, in response to the command indicator identifying the PAO command, a PAO index is extracted from the request. In an example, when the memory request is in the form of a CPI packet, the PAO index is in a field in an extension portion of a CPI extended header. In an example, the extended header includes a second extension portion that includes an argument to the PAO. In an example, the second extension portion includes between one and four arguments.

At operation 720, the PAO is invoked based on the PAO index. In an example, invoking the PAO based on the PAO index includes retrieving a kernel from a PAO memory of the memory controller based on the PAO index and executing the kernel on a PAU of the memory controller. In an example, retrieving the kernel based on the PAO index includes reading a partition from the PAO memory starting at the PAO index.

In an example, the operations of the method 700 can be extended to include generating a memory response and communicating the memory response to a requestor that provided the memory request. Here, the memory response is generated in response to completion of the PAO and the memory response includes output from the PAO in data fields of the memory response. In an example, generating the memory response includes creating a CPI packet (e.g., CPI response packet 600). In an example, the memory request was obtained from a CPI virtual channel one and the memory response is communicated using CPI virtual channel two.

Figure 8:
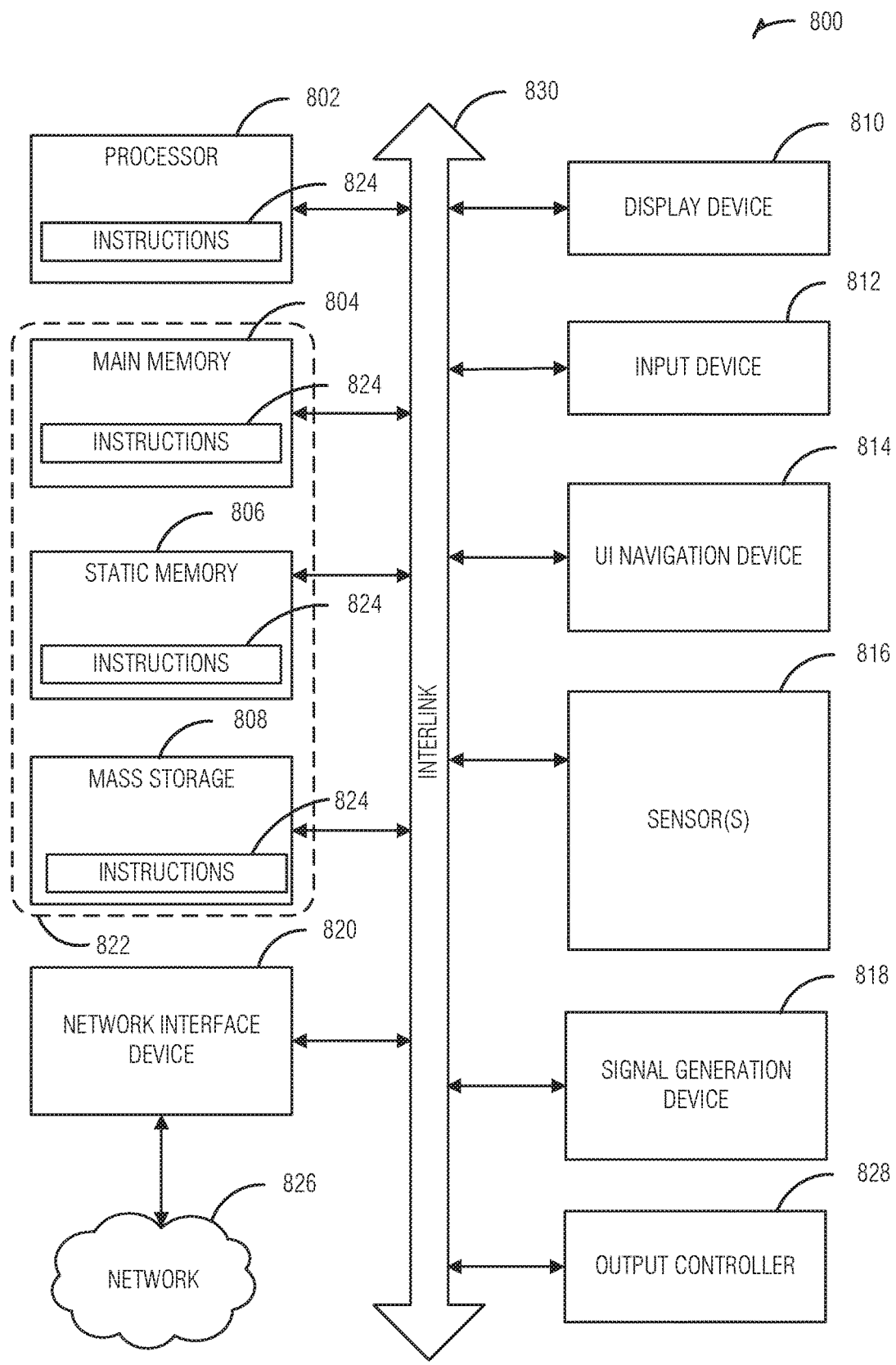
FIG. 8 is a block diagram of an example of a machine with which, in which, or by which embodiments of the present disclosure can operate.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which can communicate with each other via an interlink (e.g., bus) 830. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine readable media 822. While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is a memory controller for communicating a programmable atomic operator (PAO) to a memory controller, the memory controller comprising: a network interface configured to obtain a memory request; a packet decoder configured to extract from the memory request: a command indicator, the command indicator indicating a PAO command; and a PAO index in response to the command indicator indicating the PAO command; and a programmable atomic unit (PAU) configured to invoke the PAO based on the PAO index.

In Example 2, the subject matter of Example 1, wherein the memory request is in the form of a chiplet packet interface (CPI) packet.

In Example 3, the subject matter of Example 2, wherein the command indicator is in a first thirty-six bits of a header for the CPI packet.

In Example 4, the subject matter of Example 3, wherein the header is an extended header; and wherein the PAO index is in a field in an extension portion of the extended header.

In Example 5, the subject matter of Example 4, wherein the extended header includes a second extension portion that includes an argument to the PAO.

In Example 6, the subject matter of Example 5, wherein the second extension portion includes between one and four arguments.

In Example 7, the subject matter of any of Examples 1-6, wherein, to invoke the PAO based on the PAO index, the PAU is configured to: retrieve, based on the PAO index, a kernel from a PAO memory in the PAU; and execute the kernel.

In Example 8, the subject matter of Example 7, wherein, to retrieve the kernel based on the PAO index, the PAU is configured to read a partition from the PAO memory starting at the PAO index.

In Example 9, the subject matter of any of Examples 1-8, comprising: a packet encoder configured to generate a memory response in response to completion of the PAO, the memory response including output from the PAO in data fields; and wherein the network interface is configured to communicate the memory response to a requestor that provided the memory request.

In Example 10, the subject matter of Example 9, wherein, to generate the memory response, the packet encoder is configured to create a chiplet packet interface (CPI) packet.

In Example 11, the subject matter of Example 10, wherein the memory request was obtained from a CPI virtual channel one; and wherein, to communicate the memory response, the network interface is configured to use CPI virtual channel two.

Example 12 is a method comprising: obtaining, at the memory controller, a memory request; extracting, from the memory request, a command indicator, the command indicator indicating a PAO command; extracting, in response to the command indicator indicating the PAO command, a PAO index from the request; and invoking the PAO based on the PAO index.

In Example 13, the subject matter of Example 12, wherein the memory request is in the form of a chiplet packet interface (CPI) packet.

In Example 14, the subject matter of Example 13, wherein the command indicator is in a first thirty-six bits of a header for the CPI packet.

In Example 15, the subject matter of Example 14, wherein the header is an extended header; and wherein the PAO index is in a field in an extension portion of the extended header.

In Example 16, the subject matter of Example 15, wherein the extended header includes a second extension portion that includes an argument to the PAO.

In Example 17, the subject matter of Example 16, wherein the second extension portion includes between one and four arguments.

In Example 18, the subject matter of any of Examples 12-17, wherein invoking the PAO based on the PAO index includes a programmable atomic unit (PAU) of the memory controller: retrieving, based on the PAO index, a kernel from a PAO memory in the PAU; and executing the kernel.

In Example 19, the subject matter of Example 18, wherein retrieving the kernel based on the PAO index includes reading a partition from the PAO memory starting at the PAO index.

In Example 20, the subject matter of any of Examples 12-19, comprising: generating a memory response, the memory response generated in response to completion of the PAO, the memory response including output from the PAO in data fields; and communicating the memory response to a requestor that provided the memory request.

In Example 21, the subject matter of Example 20, wherein generating the memory response includes creating a chiplet packet interface (CPI) packet.

In Example 22, the subject matter of Example 21, wherein the memory request was obtained from a CPI virtual channel one; and wherein communicating the memory response includes using CPI virtual channel two.

Example 23 is a machine-readable medium including instructions that, when executed by circuitry of a memory controller, cause the memory controller to perform operations comprising: obtaining a memory request; extracting, from the memory request, a command indicator, the command indicator indicating a PAO command; extracting, in response to the command indicator indicating the PAO command, a PAO index from the request; and invoking the PAO based on the PAO index.

In Example 24, the subject matter of Example 23, wherein the memory request is in the form of a chiplet packet interface (CPI) packet.

In Example 25, the subject matter of Example 24, wherein the command indicator is in a first thirty-six bits of a header for the CPI packet.

In Example 26, the subject matter of Example 25, wherein the header is an extended header; and wherein the PAO index is in a field in an extension portion of the extended header.

In Example 27, the subject matter of Example 26, wherein the extended header includes a second extension portion that includes an argument to the PAO.

In Example 28, the subject matter of Example 27, wherein the second extension portion includes between one and four arguments.

In Example 29, the subject matter of any of Examples 23-28, wherein invoking the PAO based on the PAO index includes a programmable atomic unit (PAU) of the memory controller: retrieving, based on the PAO index, a kernel from a PAO memory in the PAU; and executing the kernel.

In Example 30, the subject matter of Example 29, wherein retrieving the kernel based on the PAO index includes reading a partition from the PAO memory starting at the PAO index.

In Example 31, the subject matter of any of Examples 23-30, wherein the operations comprise: generating a memory response, the memory response generated in response to completion of the PAO, the memory response including output from the PAO in data fields; and communicating the memory response to a requestor that provided the memory request.

In Example 32, the subject matter of Example 31, wherein generating the memory response includes creating a chiplet packet interface (CPI) packet.

In Example 33, the subject matter of Example 32, wherein the memory request was obtained from a CPI virtual channel one; and wherein communicating the memory response includes using CPI virtual channel two.

Example 34 is a system comprising: means for obtaining a memory request; means for extracting, from the memory request, a command indicator, the command indicator indicating a PAO command; means for extracting, in response to the command indicator indicating the PAO command, a PAO index from the request; and invoking the PAO based on the PAO index.

In Example 35, the subject matter of Example 34, wherein the memory request is in the form of a chiplet packet interface (CPI) packet.

In Example 36, the subject matter of Example 35, wherein the command indicator is in a first thirty-six bits of a header for the CPI packet.

In Example 37, the subject matter of Example 36, wherein the header is an extended header; and wherein the PAO index is in a field in an extension portion of the extended header.

In Example 38, the subject matter of Example 37, wherein the extended header includes a second extension portion that includes an argument to the PAO.

In Example 39, the subject matter of Example 38, wherein the second extension portion includes between one and four arguments.

In Example 40, the subject matter of any of Examples 34-39, wherein the system includes a programmable atomic unit comprising: means for retrieving, based on the PAO index, a kernel from a PAO memory in the PAU; and means for executing the kernel.

In Example 41, the subject matter of Example 40, wherein the means for retrieving the kernel based on the PAO index include means for reading a partition from the PAO memory starting at the PAO index.

In Example 42, the subject matter of any of Examples 34-41, comprising: means for generating a memory response, the memory response generated in response to completion of the PAO, the memory response including output from the PAO in data fields; and means for communicating the memory response to a requestor that provided the memory request.

In Example 43, the subject matter of Example 42, wherein the means for generating the memory response include means for creating a chiplet packet interface (CPI) packet.

In Example 44, the subject matter of Example 43, wherein the memory request was obtained from a CPI virtual channel one; and wherein the means for communicating the memory response include means for using CPI virtual channel two.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
a network interface couplable to a host or chiplet in a chiplet system configured to obtain a memory request;
a packet decoder configured to extract from the memory request:
a command indicator, the command indicator indicating a programmable atomic operator command, the command indicator being a memory command request type that is generic to multiple programmable atomic operators supported by the apparatus; and
a programmable atomic operator index in response to the command indicator indicating the programmable atomic operator command, the programmable atomic operator index being a location of a kernel for the programmable atomic operator command in a programmable atomic operator memory of a programmable atomic operator unit of the apparatus, the kernel comprising programming code instructions used to implement the programmable atomic operation command, the location of the kernel established when the programming code instructions of the kernel are loaded into the programmable atomic operator memory programmable atomic operator unit of the apparatus while the apparatus is operating; and the programmable atomic unit configured to invoke the programmable atomic operator based on the programmable atomic operator index, the programmable atomic unit including the programmable atomic operator memory.

2. The apparatus of claim 1, wherein the memory request is in the form of a chiplet packet interface (CPI) packet.

3. The apparatus of claim 2, wherein the command indicator is in a first thirty-six bits of a header for the CPI packet.

4. The apparatus of claim 3, wherein the header is an extended header; and wherein the programmable atomic operator index is in a field in an extension portion of the extended header.

5. The apparatus of claim 4, wherein the extended header includes a second extension portion that includes an argument to the programmable atomic operator.

6. The apparatus of claim 5, wherein the second extension portion includes between one and four arguments.

7. The apparatus of claim 1, wherein, to invoke the programmable atomic operator based on the programmable atomic operator index, the programmable atomic unit is configured to:

retrieve, based on the programmable atomic operator index, the kernel from the programmable atomic operator memory in the programmable atomic unit; and execute the kernel.

8. The apparatus of claim 7, wherein, to retrieve the kernel based on the programmable atomic operator index, the programmable atomic unit is configured to read a partition from the programmable atomic operator memory starting at the programmable atomic operator index.

9. The apparatus of claim 1, comprising:

a packet encoder configured to generate a memory response in response to completion of the programmable atomic operator, the memory response including output from the programmable atomic operator in data fields; and wherein the network interface is configured to communicate the memory response to a requestor that provided the memory request.

10. The apparatus of claim 9, wherein, to generate the memory response, the packet encoder is configured to create a chiplet packet interface (CPI) packet.

11. The apparatus of claim 10, wherein the memory request was obtained from a CPI virtual channel one; and wherein, to communicate the memory response, the network interface is configured to use a CPI virtual channel two.

12. A method comprising:

obtaining, at the memory controller, a memory request;

extracting, from the memory request, a command indicator, the command indicator indicating a programmable atomic operator command, the command indicator being a memory command request type that is generic to multiple programmable atomic operators supported by the memory controller;

extracting, in response to the command indicator indicating the programmable atomic operator command, a programmable atomic operator index from the request, the programmable atomic operator index being a location of a kernel for the programmable atomic operator command in a programmable atomic operator memory of a programmable atomic operator unit of the memory controller, the kernel comprising programming code instructions used to implement the programmable atomic operation command, the location of the kernel established when the programming code instructions of the kernel are loaded into the programmable atomic operator memory programmable atomic operator unit of the memory controller while the memory controller is operating; and invoking the programmable atomic operator based on the programmable atomic operator index.

13. The method of claim 12, wherein the memory request is in the form of a chiplet packet interface (CPI) packet.

14. The method of claim 13, wherein the command indicator is in a first thirty-six bits of a header for the CPI packet.

15. The method of claim 14, wherein the header is an extended header; and wherein the programmable atomic operator index is in a field in an extension portion of the extended header.

16. The method of claim 15, wherein the extended header includes a second extension portion that includes an argument to the programmable atomic operator.

17. The method of claim 16, wherein the second extension portion includes between one and four arguments.

18. The method of claim 12, wherein invoking the programmable atomic operator based on the programmable atomic operator index includes a programmable atomic unit of the memory controller:

retrieving, based on the programmable atomic operator index, the kernel from the programmable atomic operator memory in the programmable atomic unit; and executing the kernel.

19. The method of claim 18, wherein retrieving the kernel based on the programmable atomic operator index includes reading a partition from the programmable atomic operator memory starting at the programmable atomic operator index.

20. The method of claim 12, comprising:

generating a memory response, the memory response generated in response to completion of the programmable atomic operator, the memory response including output from the programmable atomic operator in data fields; and communicating the memory response to a requestor that provided the memory request.

21. The method of claim 20, wherein generating the memory response includes creating a chiplet packet interface (CPI) packet.

22. The method of claim 21, wherein the memory request was obtained from a CPI virtual channel one; and wherein communicating the memory response includes using a CPI virtual channel two.

23. A non-transitory machine-readable medium including instructions that, when executed by circuitry of a memory controller, cause the memory controller to perform operations comprising:

obtaining a memory request;

extracting, from the memory request, a command indicator, the command indicator indicating a programmable atomic operator command, the command indicator being a memory command request type that is generic to multiple programmable atomic operators supported by the memory controller;

extracting, in response to the command indicator indicating the programmable atomic operator command, a programmable atomic operator index from the request, the programmable atomic operator index being a location of a kernel for the programmable atomic operator command in a programmable atomic operator memory of a programmable atomic operator unit of the memory controller, the kernel comprising programming code instructions used to implement the programmable atomic operation command, the location of the kernel established when the programming code instructions of the kernel are loaded into the programmable atomic operator memory programmable atomic operator unit of the memory controller while the memory controller is operating; and invoking, via the programmable atomic operator unit, the programmable atomic operator based on the programmable atomic operator index.

24. The non-transitory machine-readable medium of claim 23, wherein the memory request is in the form of a chiplet packet interface (CPI) packet.

25. The non-transitory machine-readable medium of claim 24, wherein the command indicator is in a first thirty-six bits of a header for the CPI packet.

26. The non-transitory machine-readable medium of claim 25, wherein the header is an extended header; and
wherein the programmable atomic operator index is in a field in an extension portion of the extended header.

27. The non-transitory machine-readable medium of claim 26, wherein the extended header includes a second extension portion that includes an argument to the programmable atomic operator.

28. The non-transitory machine-readable medium of claim 27, wherein the second extension portion includes between one and four arguments.

29. The non-transitory machine-readable medium of claim 23, wherein invoking the programmable atomic operator based on the programmable atomic operator index includes a programmable atomic unit of the memory controller:
retrieving, based on the programmable atomic operator index, the kernel from the programmable atomic operator memory in the programmable atomic unit; and
executing the kernel.

30. The non-transitory machine-readable medium of claim 29, wherein retrieving the kernel based on the programmable atomic operator index includes reading a partition from the programmable atomic operator memory starting at the programmable atomic operator index.

31. The non-transitory machine-readable medium of claim 23, wherein the operations comprise:
generating a memory response, the memory response generated in response to completion of the programmable atomic operator, the memory response including output from the programmable atomic operator in data fields; and
communicating the memory response to a requestor that provided the memory request.

32. The non-transitory machine-readable medium of claim 31, wherein generating the memory response includes creating a chiplet packet interface (CPI) packet.

33. The non-transitory machine-readable medium of claim 32, wherein the memory request was obtained from a CPI virtual channel one; and wherein communicating the memory response includes using a CPI virtual channel two.

34. A system comprising:
means for obtaining a memory request;
means for extracting, from the memory request, a command indicator, the command indicator indicating a programmable atomic operator command, the command indicator being a memory command request type that is generic to multiple programmable atomic operators supported by the system;
means for extracting, in response to the command indicator indicating the programmable atomic operator command, a programmable atomic operator index from the request, the programmable atomic operator index being a location of a kernel for the programmable atomic operator command in a programmable atomic operator memory of a programmable atomic operator unit of the system, the kernel comprising programming code instructions used to implement the programmable atomic operation command, the location of the kernel established when the programming code instructions of the kernel are loaded into the programmable atomic operator memory programmable atomic operator unit of the system while the system is operating; and
invoking, via the programmable atomic operator unit, the programmable atomic operator based on the programmable atomic operator index.

35. The system of claim 34, wherein the memory request is in the form of a chiplet packet interface (CPI) packet.

36. The system of claim 35, wherein the command indicator is in a first thirty-six bits of a header for the CPI packet.

37. The system of claim 36, wherein the header is an extended header; and
wherein the programmable atomic operator index is in a field in an extension portion of the extended header.

38. The system of claim 37, wherein the extended header includes a second extension portion that includes an argument to the programmable atomic operator.

39. The system of claim 38, wherein the second extension portion includes between one and four arguments.

40. The system of claim 34, wherein the system includes a programmable atomic unit comprising:
means for retrieving, based on the programmable atomic operator index, the kernel from the programmable atomic operator memory in the programmable atomic unit; and
means for executing the kernel.

41. The system of claim 40, wherein the means for retrieving the kernel based on the programmable atomic operator index include means for reading a partition from the programmable atomic operator memory starting at the programmable atomic operator index.

42. The system of claim 34, comprising:
means for generating a memory response, the memory response generated in response to completion of the programmable atomic operator, the memory response including output from the programmable atomic operator in data fields; and
means for communicating the memory response to a requestor that provided the memory request.

43. The system of claim 42, wherein the means for generating the memory response include means for creating a chiplet packet interface (CPI) packet.

44. The system of claim 43, wherein the memory request was obtained from a CPI virtual channel one; and
wherein the means for communicating the memory response include means for using a CPI virtual channel two.

\* \* \* \* \*